United States Patent
Hanson et al.

(10) Patent No.: US 10,701,471 B1
(45) Date of Patent: Jun. 30, 2020

(54) EAR TIP WITH INCREASED MATERIAL LOADING

(71) Applicant: Bose Corporation, Framingham, MA (US)

(72) Inventors: Caitlin Hanson, Westborough, MA (US); Shawn Prevoir, Northborough, MA (US); Natalie Zucker, Allston, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 16/230,819

(22) Filed: Dec. 21, 2018

(51) Int. Cl.
*H04R 1/10* (2006.01)
*C09K 5/06* (2006.01)
*H04R 25/00* (2006.01)

(52) U.S. Cl.
CPC ........... *H04R 1/1016* (2013.01); *C09K 5/063* (2013.01); *H04R 1/105* (2013.01); *H04R 1/1066* (2013.01); *H04R 25/652* (2013.01)

(58) Field of Classification Search
CPC ..... H04R 1/1016; H04R 1/105; H04R 1/1066
USPC .......................... 381/380, 381; 181/135, 132
See application file for complete search history.

(56) References Cited

U.S. PATENT DOCUMENTS

| | | | |
|---|---|---|---|
| 2014/0140565 A1* | 5/2014 | Liu | H04R 1/1091 381/380 |
| 2015/0038774 A1 | 2/2015 | Poulsen | |
| 2017/0007861 A1* | 1/2017 | Parham | A61M 16/0605 |
| 2018/0109861 A1 | 4/2018 | Prevoir et al. | |

OTHER PUBLICATIONS

International Search Report and the Written Opinion of the International Searching Authority, International Application No. PCT/US2019/067842, pp. 1-12, dated Mar. 12, 2020.

\* cited by examiner

*Primary Examiner* — Fan S Tsang
*Assistant Examiner* — Julie X Dang
(74) *Attorney, Agent, or Firm* — Bond, Schoenech & King, PLLC (57) ABSTRACT

An ear tip for an earpiece including a body having first and second ends, an inner wall extending between the first and second ends to define a hollow passage to conduct sound waves, and an outer wall connected to the inner wall of the body at the first end and tapering away from the inner wall toward the second end. The ear tip further includes one or more protrusions arranged on an inner surface of the outer wall, wherein the one or more protrusions has a varying thickness between the first and second ends.

19 Claims, 6 Drawing Sheets

EAR TIP WITH INCREASED MATERIAL LOADING

BACKGROUND

This disclosure generally relates to configurations for ear tips for use with earpieces.

SUMMARY

All examples and features mentioned below can be combined in any technically possible way.

In one aspect, an ear tip for an earpiece includes a body having first and second ends, an inner wall extending between the first and second ends to define a hollow passage to conduct sound waves, and an outer wall connected to the inner wall of the body at the first end and tapering away from the inner wall toward the second end. The ear tip further includes one or more protrusions arranged on an inner surface of the outer wall and the one or more protrusions has a varying thickness between the first and second ends.

Implementations may include one or more of the following. The outer wall can form a generally frustoconical shape around the inner wall. The one or more protrusions can have a thicker portion that is closer to the second end than the first end.

The ear tip can include first and second protrusions arranged on the inner surface of the outer wall, the first and second protrusions having first and second thicknesses. The first and second protrusions can be separated by at least one circumferential outer wall portion having a thickness that is thinner than the first and second thicknesses of the first and second protrusions. The first and second protrusions can be arranged at opposite points on the inner surface of the outer wall such that centers of the first and second protrusions are separated by 180 degrees along the inner surface of the outer wall. The first and second protrusions can be separated by two circumferential outer wall portions having thicknesses that are smaller than the first and second thicknesses of the first and second protrusions.

The one or more protrusions can include one or more phase change materials having a phase change ability from solid to liquid state at a predetermined phased-change temperature. The body can include one or more phase change materials, and the amount of phase change material in the body and the first and second protrusions can be equal to or greater than 25% by weight. The amount of phase change material in the body and the first and second protrusions can be equal to or greater than 35% by weight.

In another aspect, an ear tip for an earpiece includes a body having first and second ends, an inner wall extending between the first and second ends to define a hollow passage to conduct sound waves, and an outer wall connected to the inner wall of the body at the first end and tapering away from the inner wall toward the second end. The ear tip further includes one or more protrusions arranged on an inner surface of the outer wall, the one or more protrusions having a thicker portion and a thinner portion. The thicker portion of the one or more protrusions is closer to the second end than the first end. The one or more protrusions can have a varying thickness between the first and second end.

Implementations may include one or more of the following. The ear tip can include first and second protrusions arranged on the inner surface of the outer wall, the first and second protrusions having first and second thicknesses. The first and second protrusions can be separated by at least one circumferential outer wall portion having a thickness that is thinner than the first and second thicknesses of the first and second protrusions. The first and second protrusions can be arranged at opposite points on the inner surface of the outer wall such that centers of the first and second protrusions are separated by 180 degrees along the inner surface of the outer wall. The first and second protrusions can be separated by two circumferential outer wall portions having thicknesses that are smaller than the first and second thicknesses of the first and second protrusions.

The one or more protrusions can include one or more phase change materials having a phase change ability from solid to liquid state at a predetermined phased-change temperature. The body can include one or more phase change materials, and the amount of phase change material in the body and the first and second protrusions can be equal to or greater than 25% by weight. The amount of phase change material in the body and the first and second protrusions can be equal to or greater than 35% by weight.

In a further aspect, an ear tip for an earpiece includes a body having first and second ends, an inner wall extending between the first and second ends to define a hollow passage to conduct sound waves, and an outer wall connected to the inner wall of the body at the first end and tapering away from the inner wall toward the second end. The ear tip further includes first and second ribs arranged on an inner surface of the outer wall such that centers of the first and second ribs are diametrically opposed on the inner surface of the outer wall, the first and second ribs having first and second thicknesses. The ear tip further includes at least one circumferential outer wall portion arranged between the first and second ribs, the at least one circumferential outer wall portion having a third thickness that is thinner than the first and second thicknesses of the first and second ribs. The first and second ribs include one or more phase change materials having a phase change ability from solid to liquid state at a predetermined phased-change temperature.

Other features and advantages will be apparent from the description and the claims.

DETAILED DESCRIPTION

This disclosure describes configurations that enable increased loading of phase change material into the ear tips of earpieces. Earpieces can be placed within human ears, e.g., as part of earphones, headphones, and other wired or wireless devices to deliver sound. While in contact with the user's ear canal and ear, earpieces can become uncomfortable due to increasing in-ear temperatures. Phase change materials can absorb heat as temperature rises by using the heat energy to melt the solid to liquid. As the temperature cools, the phase change material releases the heat and changes back to a solid. The phase change material can be used to regulate the temperature of a person wearing an earpiece and thus, reduce discomfort. The more phase change material that can be placed in contact with the body, the more heat energy can be absorbed, thereby providing a longer cooling effect. Unfortunately, while increasing the amount of phase change material can provide improved temperature regulation, the increased amount of phase change material can also cause the material to become too hard, prone to tearing, and reduce elasticity and thus, become less robust and less comfortable. Increasing the amount of phase change material in ear tips can also negatively affect or interfere with acoustic sealing depending on the location of the additional phase change material.

The present disclosure describes configurations that enable increased loading of phase change material into the ear tip to reduce discomfort to the wearer. The increased loading of phase change material provides a longer cooling effect while in contact with the user's ear without significantly affecting acoustic sealing or making the ear tip too rigid. This disclosure is based, at least in part, on the realization that the umbrella-shaped deformable portion of the ear tip can be modified to increase the volume of the umbrella-shaped deformable portion and thereby increase the amount of phase change material contained in the ear tip without sacrificing acoustic sealing. The additional phase change material accommodated in the increased volume of the umbrella-shaped deformable portion provides a longer cooling effect when in contact with the user's ear. More specifically, the additional phase change material can be positioned in particular parts of the umbrella-shaped deformable portion that contact the user's ear when in use as further described below.

The embodiments and implementations disclosed or otherwise envisioned herein can be utilized with any suitable earpiece made of a material possessing elastomeric properties. Example materials possessing elastomeric properties include rubbers and thermoplastic materials. Examples of suitable earpieces include Bose QuietControl® headphones (manufactured by Bose Corporation of Framingham, Mass.), noise-blocking earplugs, and hearing aids. However, the disclosure is not limited to these devices, and thus the disclosure and embodiments disclosed herein can encompass any earpiece configured to be placed at least partially within human ears.

Figure 1:
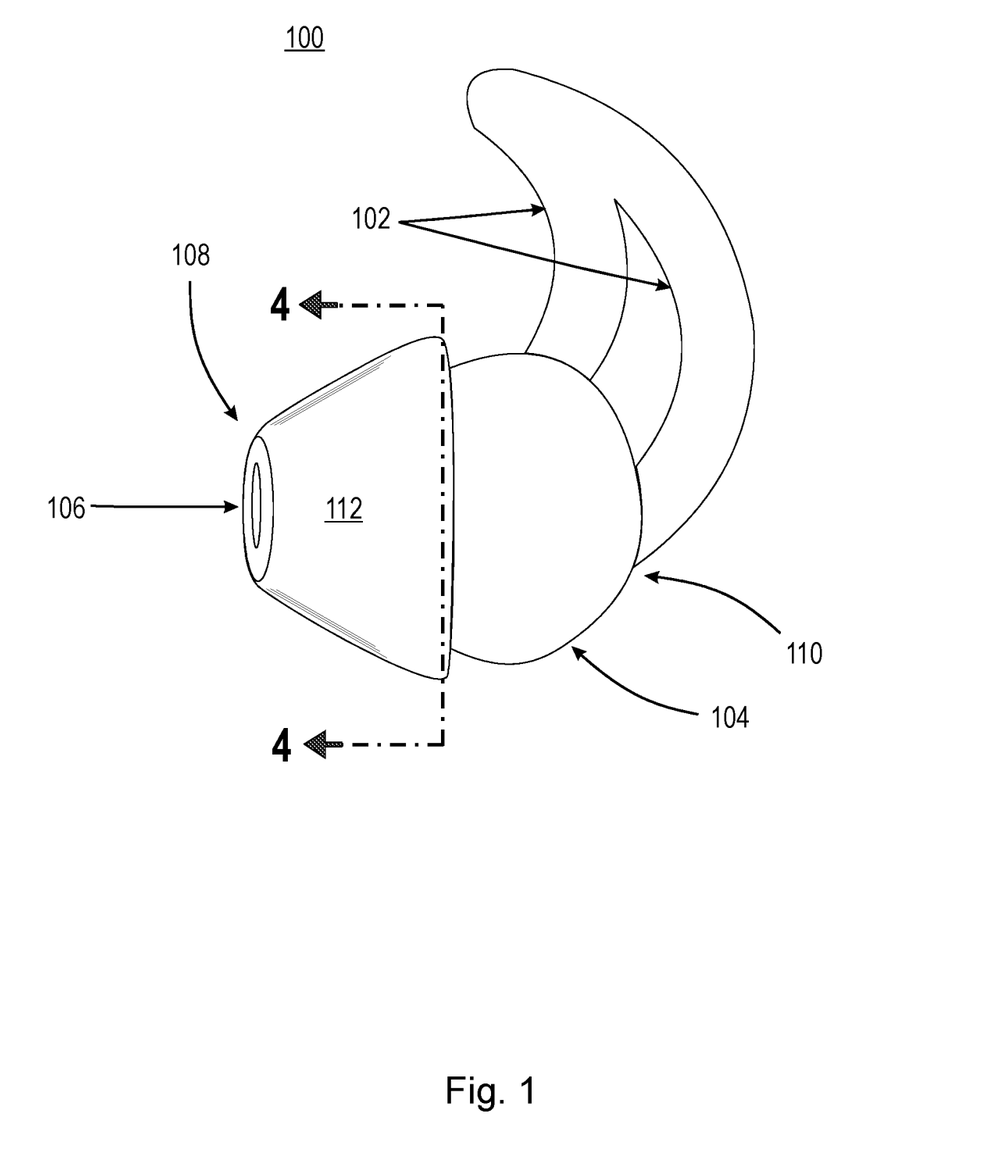
FIG. 1 is an example earpiece.
Figure 2:
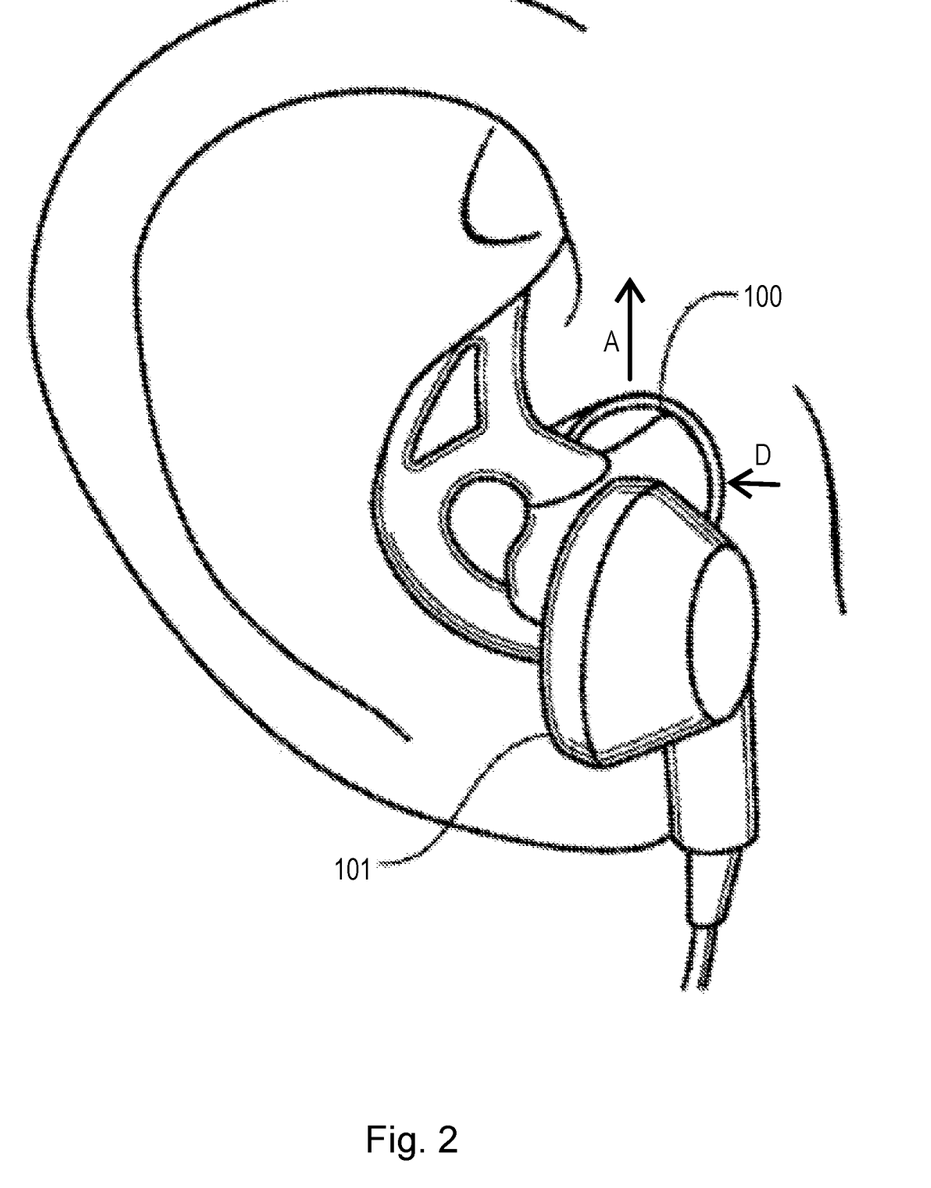
FIG. 2 is an example headphone with an earpiece.
Figure 3:
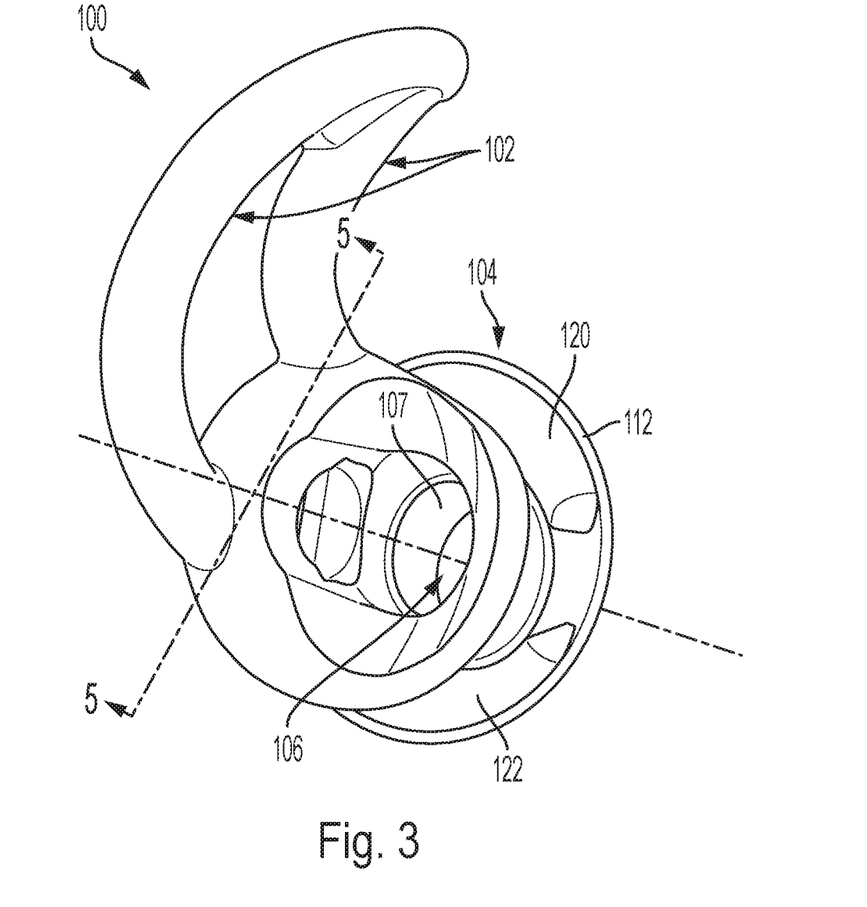
FIG. 3 is a partial cross-sectional view of an example earpiece.

FIG. 1 shows an example earpiece 100 including an ear tip that is configured to fit at least partially into a person's ear canal and a retaining structure configured to hold the ear tip in place when worn. FIG. 2 is an example headphone 101 with earpiece 100. FIG. 3 is a partial cross-sectional view of earpiece 100. The following should be viewed in light of FIGS. 1-3. Earpiece 100 can include retaining legs 102, body 104, and hollow passage 106. Although FIGS. 1-3 show retaining legs 102 as one embodiment of a retaining structure, this disclosure is not limited to such a configuration. Any type of retaining structure is contemplated. Alternatively, the retaining structure can be omitted altogether. The retaining legs 100 are optional.

Body 104 includes first end 108 and second end 110 opposite the first end 108. Second end 110 is proximate to the retaining legs 102. Body 104 further includes inner wall 107 extending between the first end 108 and the second end 110. Inner wall 107 defines and surrounds hollow passage 106 which can be configured to conduct sound waves. Body 104 also includes outer wall 112 connected to the inner wall 107 at the first end 108. Outer wall 112 tapers away from the inner wall 107 toward the second end 110. In example embodiments, outer wall 112 is frustoconical in shape. As shown in FIGS. 1-3, outer wall 112 tapers toward the second end 110 but does not necessarily reach the second end 110. In alternate embodiments not shown, outer wall 112 could extend to the second end 110 or beyond second end 110.

Body 104 can be configured as part of a headphone in example embodiments. In such embodiments, an acoustic driver module 101 can be connected to the earpiece 100 as shown in FIG. 2. In alternate embodiments, earpieces may be connected to an audio generation device wirelessly. In embodiments where the hollow passage 106 conducts sound waves, such sound waves can be conducted from the second end 110 toward the first end 108 and into a person's ear canal. Body 104 can also be configured as passive earplugs that do not have any connections or acoustic features. Regardless of whether body 104 contains any connections or acoustic features, inserting the body 104 into the outer ear and the ear canal causes the inner and outer walls 107, 112 of body 104 to deform to conform to the anatomical features in the user's ear canal.

Figure 4:
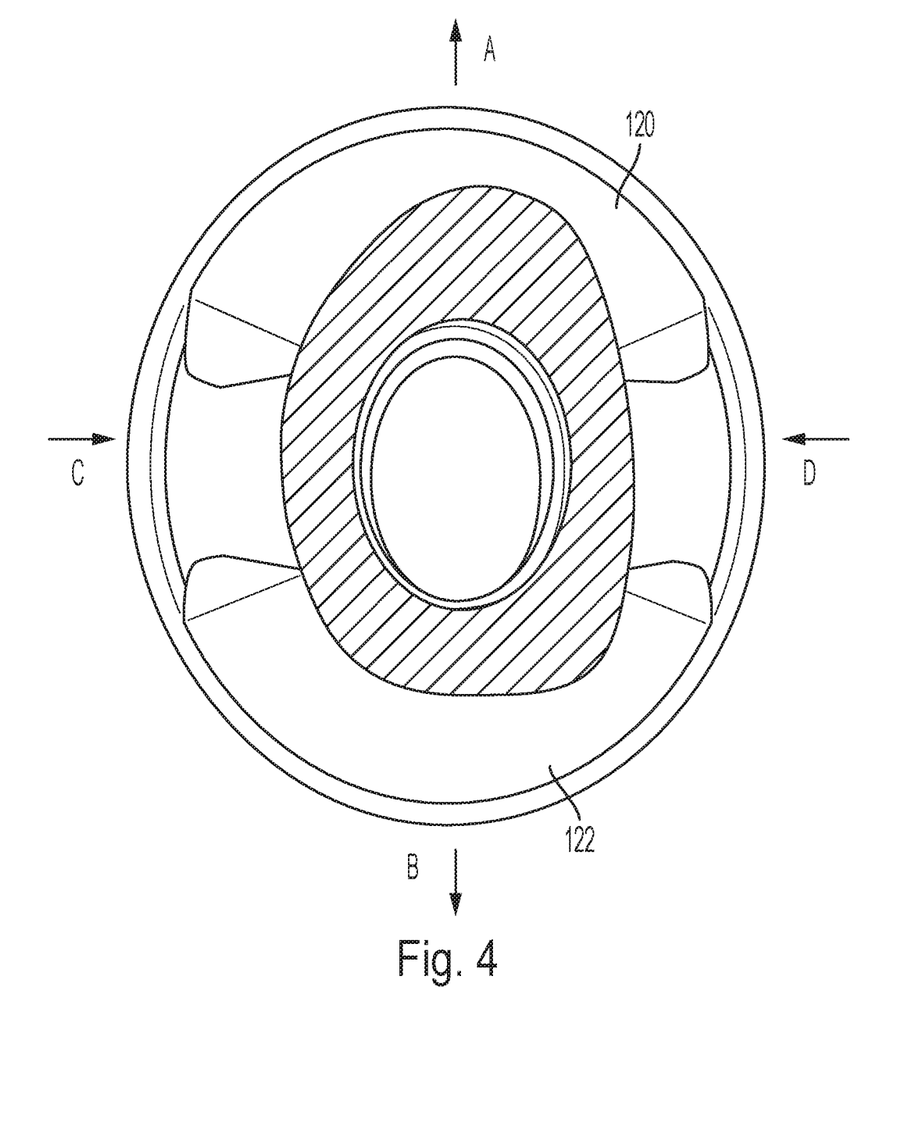
FIG. 4 is a top down view of the earpiece shown in FIGS. 1 and 3, taken generally along line 4-4 in FIG. 1.

Referring to FIG. 3 and FIG. 4, which shows a cutaway of a top down view of the earpiece shown in FIG. 3, when body 104 is inserted into a user's ear, portions of outer wall 112 deform naturally in particular directions. For example, portions A, B, C, and D tend to be displaced in the directions shown, respectively. Portions A and B are displaced in opposite directions away from each other and portions C and D are displaced in opposite directions toward each other. Portions C and D are squeezed together by the walls of the ear canal and portions A and B expand to fill open space in the ear so that portions A and B contact farther wall areas of the ear canal. The directions in which portions A and D tend to move when body 104 is inserted into a user's ear are shown in FIG. 2.

One or more protrusions 120, 122 can be added to the inside surface of outer wall 112 at portions A and B. In the example shown, protrusions 120, 122 are mirror images of each other however, they do not need to be mirror images. Protrusions 120, 122 can be arranged at opposite points on the inner surface of the outer wall 112 such that their centers are separated by approximately 180 degrees along the inner surface. In example embodiments, protrusions 120, 122 can be merely diametrically opposed along the inner surface of the outer wall 112. In FIG. 4, the protrusions are separated by two circumferential outer wall portions at portions C and D. The thicknesses of these circumferential outer wall portions at portions C and D are thinner than the thicknesses of the protrusions.

One or more phase change materials and/or stiffening materials can also be included in body 104 between the inner wall 107 and the outer wall 112. As shown in FIG. 4, this part of the body between the inner wall 107 and the outer wall 112 can also be shaped such that additional material is provided proximate to portions A and B and less material is provided proximate to portions C and D. The reduced thickness of the body proximate to portions C and D allows the inner wall 107 to contract easily. The increased thickness of the body proximate to portions A and B provides support for when the inner wall 107 expands.

Protrusions 120, 122 at portions A and B can include one or more phase change materials to provide a longer cooling effect. For example, when body 104 is inserted into a user's ear and portions A and B expand, portions A and B are pushed closer to and in contact with parts of the ear canal. The additional phase change material at portions A and B can absorb additional heat energy within the ear by contacting these parts of the ear canal thereby providing a longer cooling effect.

Although protrusions 120, 122 can include one or more phase change materials in the embodiments and implementations described herein, protrusions 120, 122 can be included in the ear tips without phase change materials. Even without one or more phase change materials, protrusions 120, 122 can fill empty spaces in the ear canal to further block outside noise from entering the ear and/or block the user's music from leaking to the outside. Thus, protrusions 120, 122 aid in the passive attenuation of the earpiece even if protrusions 120, 122 are not providing a longer cooling effect as discussed above. Of course, in embodiments where protrusions 120, 122 include one or more phase change materials, such protrusions provide a longer cooling effect and improved passive attenuation advantageously.

One or more protrusions 120, 122 can be formed into stiffening ribs as shown in FIGS. 3 and 4. The stiffening ribs extend in a circumferential direction around the inner surface of the outer wall 112, but not around the entire circumference. This non-uniform circumferential distribution of the protrusions advantageously allows additional material to be added in areas where the ear tip naturally expands in use, but not in areas where the ear tip naturally contracts.

Figure 6:
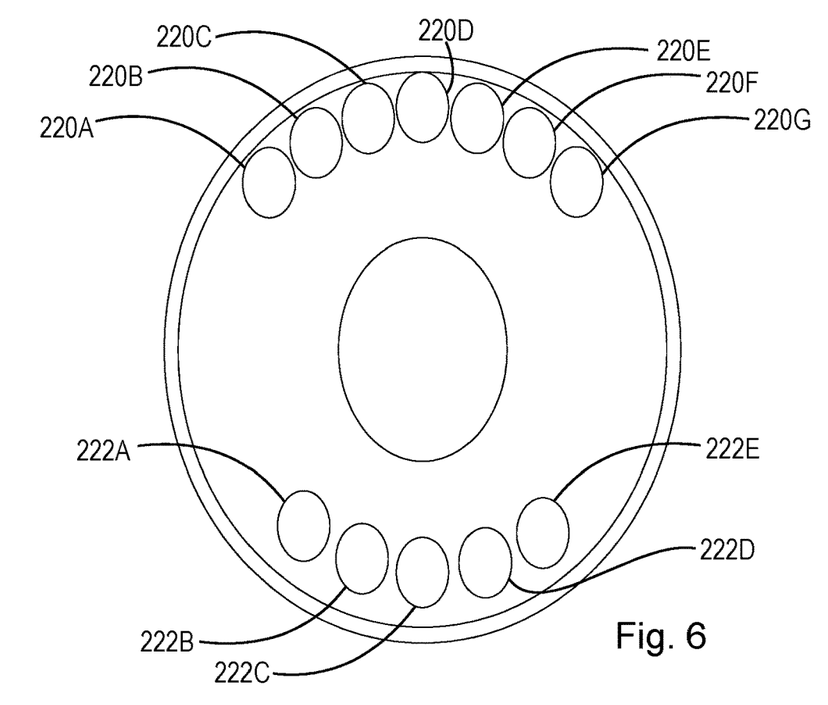
FIG. 6 shows alternate embodiments of the protrusions shown in FIG. 4.
Figure 7:
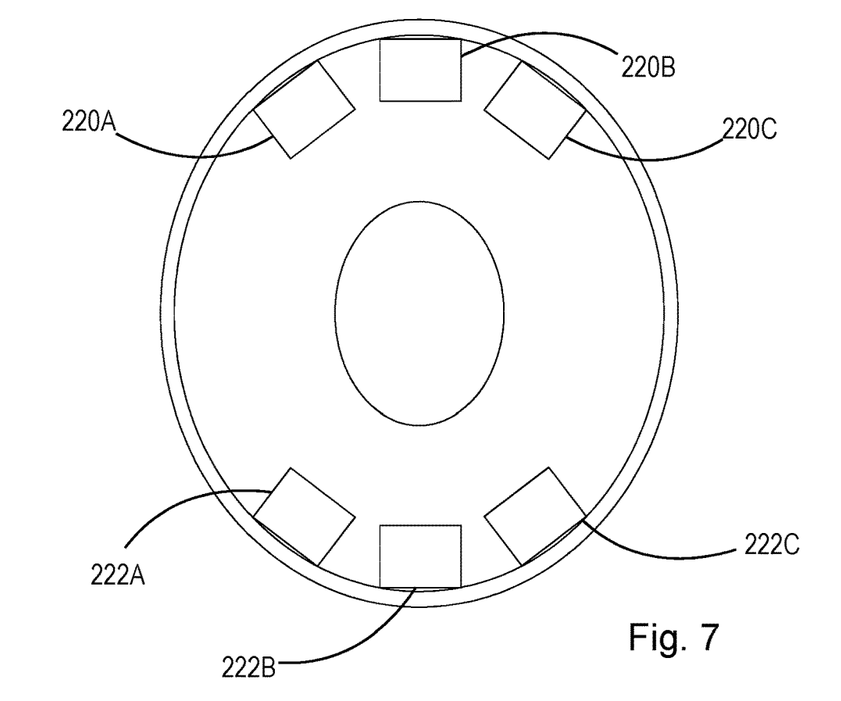
FIG. 7 shows a further embodiment of the protrusions shown in FIG. 4.

Alternatively, one or more protrusions 120, 122 can be formed into one or more pluralities of protrusions positioned at portions A and/or B. For example, the stiffening protrusions shown in FIGS. 3 and 4 can be replaced with a plurality of protrusions at portion A and/or another plurality of protrusions at portion B as shown in FIGS. 6 and 7. Pluralities of protrusions can include two or more protrusions that are arranged in contact with each other, e.g., one after the other as shown in FIG. 6 at protrusions 220A, 220B, 220C, 220D, 220E, 220F, 220G, or two or more protrusions that are arranged not in contact with each other, e.g., spaced apart as shown at protrusions 222A, 222b, 222C, 222D, 222E in FIG. 6. Pluralities of protrusions can include any number of suitable protrusions. For example, two or more protrusions are contemplated. Protrusions can take any suitable form, including, but not limited to, circular protrusions, arcuate protrusions, or rectangular protrusions 220A, 220B, 220C, 222A, 222B, 222C in FIG. 7, etc. In embodiments, the protrusions are symmetrical about its center point however, they do not need to be symmetrical.

Figure 5:
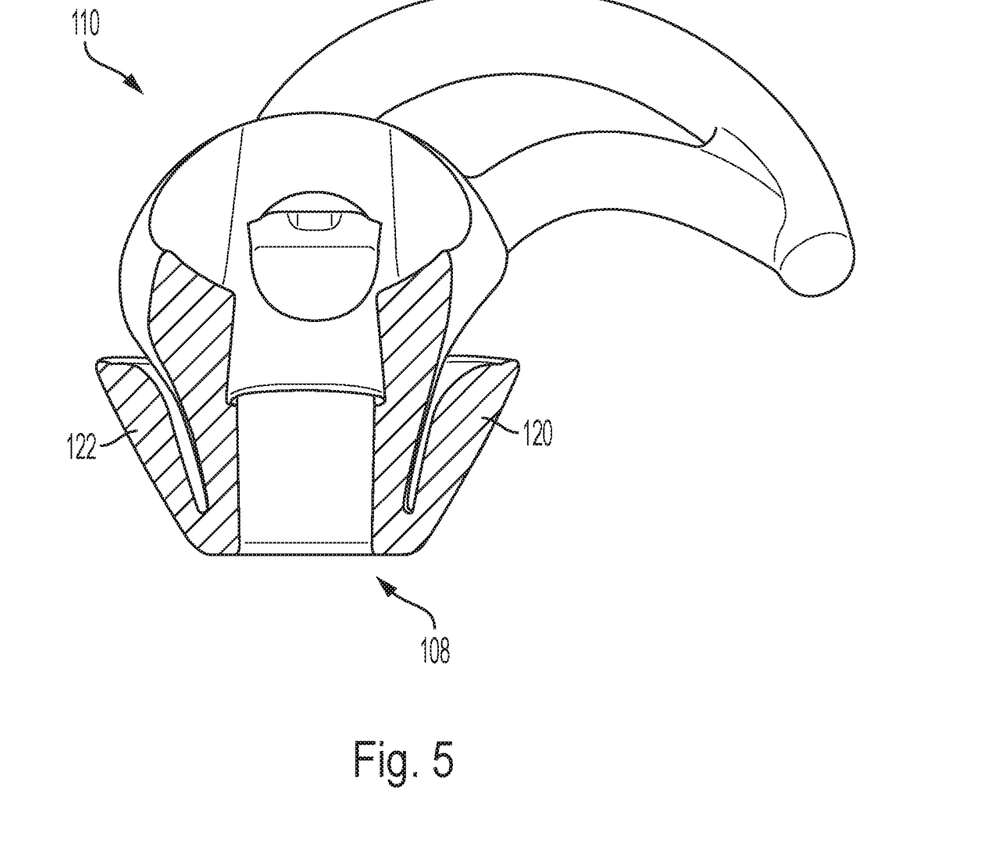
FIG. 5 is a cross-sectional view of the earpiece shown in FIG. 3, taken generally along line 5-5 in FIG. 3.

FIG. 5 shows a cross-sectional view of the earpiece shown in FIG. 3. Protrusion 120 is on the right and protrusion 122 is on the left. The thicknesses of the protrusions 120, 122 vary between first end 108 and second end 110. The thicknesses of protrusions 120, 122 are thinner proximate to first end 108 and increase in thickness toward the second end 110. However, the thicknesses do not increase linearly. The thinner portions of protrusions 120, 122 are proximate to the first end 108 because this end is farthest in the ear canal when the ear tip is inserted and there is less space for protrusions 120, 122 at this part of the ear canal. In contrast, the thicker portions of protrusions 120, 122 are proximate to the second end 110 because this end rests just outside, at, or just inside the ear canal when the ear tip is inserted and there are gaps in the ear at these positions to receive protrusions 120, 122. The additional phase change material in protrusions 120, 122 enables more heat energy to be absorbed at these positions just outside, at, or just inside the ear canal at portions A and B. The added thickness at the second end 110 can also help reduce vibration, for example, by approximately 4 decibel (dB) when used with a sound generating device. To achieve greater contact with the user's ear, outer wall 112 also includes additional material extending toward second end 110. Thus, increased phase change material can be loaded behind the outer wall 112 of the ear tip such that more heat energy can be absorbed during use without preventing a proper acoustic seal or causing discomfort since the additional material is placed in wider areas of the ear canal.

Body 104 can be made of a composition comprising an elastomer and one or more phase change materials. The one or more phase change materials can be distributed uniformly through body 104 or in specific areas. Based on the configurations described and otherwise envisioned herein, the phase change material can be present in body 104 including protrusions 120, 122 in an amount ranging between approximately 10% and approximately 40% by weight. The amount of phase change material in body 104 including protrusions 120, 122 can be equal to or greater than 25% or equal to or greater than 35% by weight, for example 38%.

The phase change material is enclosed in microspheres such that when the material undergoes a phase change to the liquid state, the liquid is contained. The outer shell of the microspheres can be made of any suitable polymer. The one or more phase change materials change from solid to liquid or liquid to solid at a predetermined temperature within the range of 25 degrees Celsius to 35 degrees Celsius. The phase change temperature can be approximately 28 degrees Celsius or 32 degrees Celsius by way of two examples. However, any suitable phase change temperature is contemplated. Thus, when a user inserts an earpiece into the user's ear and the temperature of the ear canal increases, the one or more phase change materials melt and store heat thereby drawing the heat away from the user's skin.

Typical earpieces that do not contain phase change material reach body temperature in less than five minutes upon being inserted into the user's ear. In example embodiments where the phase change material is a loaded gel, the gel can be packed behind the outer wall of the ear tip. With the loaded gel behind the outer wall, the ear tip reaches body temperature in twenty-five minutes. In example embodiments, the phase change material can be added to the ear tip in tool (e.g., in the body and the protrusions) so that the added step of placing the loaded gel behind the outer wall can be dispensed with advantageously.

Exemplary phase change materials include MPCM32 and MPCM28 from Microtek Laboratories Inc. located in Dayton, Ohio and EnFinit™ PCM (Phase Change Material) 28CPS and EnFinit™ PCM 35CP from Encapsys, LLC located in Appleton, Wis.

The hardness of the ear tips described herein can provide comfort while maintaining their shape and providing an improved cooling effect. In examples, the ear tips can be made of a single material having any suitable hardness (e.g., approximately 30 Shore A). In other examples, the ear tips can be made of two or more materials. For example, the outer wall of the ear tip can be made of suitable rubbers or gels having any suitable hardness (e.g., approximately 10 Shore 00) and the protrusions and/or other components of the ear tip can be made of a harder material to provided additional support. A suitable hardness for the material providing additional support is approximately 30 Shore A.

As described herein, the ear tip configurations provide an improved manufacturing process by eliminating the need to apply phase change material to a molded product. The ear tip configurations described herein also provide improved passive attenuation and, with one or more phase change materials, a longer cooling effect thereby improving the overall comfort of the ear tip to the user.

Other implementations are within the scope of the following claims and other claims to which the applicant may be entitled.

While several inventive examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive examples described herein. It is, therefore, to be understood that the foregoing examples are presented by way of example only and that, within the scope of the appended claims and equivalents thereto, inventive examples may be practiced otherwise than as specifically described and claimed. Inventive examples of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the inventive scope of the present disclosure.

What is claimed is:

1. An ear tip for an earpiece, comprising:
   a body having first and second ends, an inner wall extending between the first and second ends to define a hollow passage to conduct sound waves, and an outer wall connected to the inner wall of the body at the first end and tapering away from the inner wall toward the second end;
   a first protrusion arranged on an inner surface of the outer wall, wherein the first protrusion has a varying thickness between the first and second ends; and
   a second protrusion arranged on the inner surface of the outer wall, the first and second protrusions having first and second thicknesses.

2. The ear tip of claim 1, wherein the outer wall forms a generally frustoconical shape around the inner wall.

3. The ear tip of claim 1, wherein the first protrusion has a thicker portion that is closer to the second end than the first end.

4. The ear tip of claim 1, wherein the first and second protrusions are separated by at least one circumferential outer wall portion having a thickness that is thinner than the first and second thicknesses of the first and second protrusions.

5. The ear tip of claim 4, wherein the first and second protrusions are arranged at opposite points on the inner surface of the outer wall such that centers of the first and second protrusions are separated by 180 degrees along the inner surface of the outer wall.

6. The ear tip of claim 4, wherein the first and second protrusions are separated by two circumferential outer wall portions having thicknesses that are smaller than the first and second thicknesses of the first and second protrusions.

7. The ear tip of claim 1, wherein the first or second protrusions comprises one or more phase change materials having a phase change ability from solid to liquid state at a predetermined phase change temperature.

8. The ear tip of claim 1, wherein the body comprises one or more phase change materials, and the amount of phase change material in the body and the first and second protrusions is equal to or greater than 25% by weight.

9. The ear tip of claim 8, wherein the amount of phase change material in the body and the first and second protrusions is equal to or greater than 35% by weight.

10. An ear tip for an earpiece, comprising:
    a body having first and second ends, an inner wall extending between the first and second ends to define a hollow passage to conduct sound waves, and an outer wall connected to the inner wall of the body at the first end and tapering away from the inner wall toward the second end of the body, wherein the outer wall has a free end; and
    a first protrusion arranged on an inner surface of the outer wall, the first protrusion having a thicker portion and a thinner portion;
    wherein the thicker portion of the first protrusion is closer to the second end than the first end and connected to the free end of the outer wall.

11. The ear tip of claim 10, wherein the first protrusion has a varying thickness between the first and second end.

12. The ear tip of claim 10, wherein the ear tip further comprises a second protrusion arranged on the inner surface of the outer wall, the first and second protrusions having first and second thicknesses.

13. The ear tip of claim 12, wherein the first and second protrusions are separated by at least one circumferential outer wall portion having a thickness that is thinner than the first and second thicknesses of the first and second protrusions.

14. The ear tip of claim 12, wherein the first and second protrusions are arranged at opposite points on the inner surface of the outer wall such that centers of the first and second protrusions are separated by 180 degrees along the inner surface of the outer wall.

15. The ear tip of claim 12, wherein the first and second protrusions are separated by two circumferential outer wall portions having thicknesses that are smaller than the first and second thicknesses of the first and second protrusions.

16. The ear tip of claim 10, wherein the first or second protrusions comprises one or more phase change materials having a phase change ability from solid to liquid state at a predetermined phase change temperature.

17. The ear tip of claim 12, wherein the body comprises one or more phase change materials, and the amount of phase change material in the body and the first and second protrusions is equal to or greater than 25% by weight.

18. The ear tip of claim 17, wherein the amount of phase change material in the body and the first and second protrusions is equal to or greater than 35% by weight.

19. An ear tip for an earpiece, comprising:
    a body having first and second ends, an inner wall extending between the first and second ends to define a hollow passage to conduct sound waves, and an outer wall connected to the inner wall of the body at the first end and tapering away from the inner wall toward the second end;
    first and second ribs arranged on an inner surface of the outer wall such that centers of the first and second ribs are diametrically opposed on the inner surface of the outer wall, the first and second ribs having first and second thicknesses; and at least one circumferential outer wall portion arranged between the first and second ribs, the at least one circumferential outer wall portion having a third thickness that is thinner than the first and second thicknesses of the first and second ribs;

wherein the first and second ribs comprise one or more phase change materials having a phase change ability from solid to liquid state at a predetermined phase change temperature.

* * * * *